United States Patent [19]

Gray et al.

[11] Patent Number: 5,625,682
[45] Date of Patent: Apr. 29, 1997

[54] HELP DESK IMPROVEMENT

[75] Inventors: Thomas A. Gray, Carp; Deborah L. Pinard, Kanata, both of Canada

[73] Assignee: Mitel Corporation, Ontario, Canada

[21] Appl. No.: 369,179

[22] Filed: Jan. 5, 1995

[30] Foreign Application Priority Data

Mar. 15, 1994 [CA] Canada ................ 2119086

[51] Int. Cl.⁶ .............................. H04M 3/46; H04M 3/50
[52] U.S. Cl. .................. 379/266; 379/67; 379/142; 379/209; 379/265
[58] Field of Search ........................ 379/265, 266, 379/309, 214, 67, 218, 142, 88, 89, 127

[56] References Cited

U.S. PATENT DOCUMENTS

| | | | |
|---|---|---|---|
| 4,901,341 | 2/1990 | Carter et al. | 379/67 |
| 4,930,152 | 5/1990 | Miller | 379/67 |
| 5,103,449 | 4/1992 | Jolissaint | 379/142 |
| 5,155,761 | 10/1992 | Hammond | 379/214 |
| 5,179,585 | 1/1993 | MacMillan, Jr. et al. | 379/88 |
| 5,181,236 | 1/1993 | LaValle et al. | 379/266 |
| 5,199,062 | 3/1993 | Von Meister | 379/67 |
| 5,268,958 | 12/1993 | Nakano | 379/265 |
| 5,297,195 | 3/1994 | Thorne et al. | 379/218 |
| 5,309,504 | 5/1994 | Morganstein | 379/265 |
| 5,309,505 | 5/1994 | Szlam et al. | 379/214 |
| 5,309,513 | 5/1994 | Rose | 379/265 |
| 5,311,574 | 5/1994 | Livanos | 379/214 |
| 5,329,583 | 7/1994 | Jurgensen et al. | 379/266 |
| 5,537,470 | 7/1996 | Lee | 379/266 |

FOREIGN PATENT DOCUMENTS

| | | |
|---|---|---|
| 0480622A2 | 10/1991 | European Pat. Off. . |
| WO92/15166 | 9/1992 | WIPO . |

OTHER PUBLICATIONS

Andrew Waite, Beyond ISDN Theory, Dec. 1989, pp. 20–27.

Primary Examiner—Thomas W. Brown
Assistant Examiner—Parag Dharia
Attorney, Agent, or Firm—Charles E. Wands

[57] ABSTRACT

The present invention relates to a method of informing an agent of a follow-up call to the agent from a telephone subscriber comprised of on receiving the follow-up call from the telephone subscriber, detecting that the agent is busy, storing a callback number of the telephone subscriber, storing at least part of a message provided by the telephone subscriber in association with the callback number, determining the identity of a specific agent to which the call is to be directed, and routing the message and the callback number to the specific agent when the specific agent becomes free.

12 Claims, 3 Drawing Sheets

---

34

QUEUE ENTRY: x

TICKET NUMBER: TX12345

CLIENT ID: 1234567

NUMBER TO CALL BACK: 613-592-2122

POINTER TO VOICE MAIL BOX ENTRY: 55

34
QUEUE ENTRY: x

TICKET NUMBER: TX12345

CLIENT ID: 1234567

NUMBER TO CALL BACK: 613-592-2122

POINTER TO VOICE MAIL BOX ENTRY: 55

FIG. 3

38
DEVICE STATE ENTRY: y

STATE: BUSY

FIG. 4

HELP DESK IMPROVEMENT

FIELD OF THE INVENTION

This invention relates to the field of telephony, and in particular to a method of informing an agent, such as a company help desk agent, of information relating to follow-up calls to that agent.

BACKGROUND OF THE INVENTION

Many companies provide help agents for customers of their products. In such cases, customers call, and navigate through a menu tree of an automatic telephone system attendant, to access an appropriate agent, by pushing dial buttons on a dial tone multifrequency (DTMF) telephone. If the agent is free, the telephone system routes the call to the agent. If the agent is not free, the caller is placed on hold, and the call is answered by the agent in first in-first out sequence.

Some such systems allow a callback indication to be placed in a queue, so that when an appropriate agent becomes free, the caller will be called back in turn. The callback number is stored by the caller keying in the callback number using the telephone keypad.

Such prior art systems do not allow the storage of a voice message, which may help the follow-up sequence to a significant extent. For example, the problem of the caller may have been solved by another person, and the caller wishes to leave a message not to call back. The prior art systems make this impossible, and indeed a callback may cause the storage of another callback entry, wasting valuable memory space, and placing an inaccurate callback list burden on the agent.

The caller in a callback may only wish to leave pertinent information regarding the product discussed in the original call. The caller may not have the time to wait in a long hold queue for the agent to become free, and in prior art systems cannot leave the pertinent information. The agent may be prompted to call back the caller, but may not have the time to do so for several days. Thus there is significant delay introduced before the agent can even begin to solve the problem for which the caller originally called.

SUMMARY OF THE INVENTION

The present invention is a system in which callback callers can leave a message for an agent, which is provided with information about the caller (e.g. a callback number) for the agent. This is made possible by the original call, or the agent, causing the generation of a ticket for the original call and/or callback, which references one or plural voicemail messages left by the caller. The tickets each reference the caller by identification number, and thus can all be accessed together by an agent. The agent can thus gather all pertinent information concerning a call or a matter discussed, and decide whether to call back the caller, or deal with an issue.

In accordance with an embodiment of the invention, method of informing an agent of a follow-up call to the agent from a telephone subscriber is comprised of the steps of, on receiving said follow-up call from the telephone subscriber, detecting that the agent is busy, storing a callback number of the telephone subscriber, storing at least part of a message provided by the telephone subscriber in association with the callback number, determining the identity of a specific agent to which the call is to be directed, and routing the message and the callback number to the specific agent when the specific agent becomes free.

In accordance with another embodiment, the above method includes the steps, carried out previous to the detecting step, of receiving a preliminary call from the subscriber, speech synthesizing instructions and questions to the subscriber, automatically voice recognizing at least part of responses made by the subscriber, determining which of a plurality of agents the preliminary call should be routed to by an analysis of at least part of voice recognized responses, and routing the call to a free agent in response to said analysis.

In accordance with another embodiment, the above method includes the steps of determining that no free agent exists, storing a preliminary callback number in a queue associated with a voice mail message, and routing the preliminary callback number and associated voice mail message in their queue turn to a free agent when a free agent becomes available.

BRIEF INTRODUCTION TO THE DRAWINGS

A better understanding of the invention will be obtained by reading the description of the invention below, with reference to the following drawings, in which:

FIG. 1 is a block diagram of a system in which the invention may be implemented.

FIG. 2 is a block diagram of a software program system, including tables to be stored in a memory of the system, and certain hardware elements to be operated by software programs, FIG. 3 is a diagram of a ticket entry stored in one of the tables, and generated during operation of an embodiment of the invention, and FIG. 4 is a diagram of a device state entry stored in another one of the tables, and is used during operation of an embodiment of the invention.

DETAILED DESCRIPTION OF THE INVENTION

Figure 1:
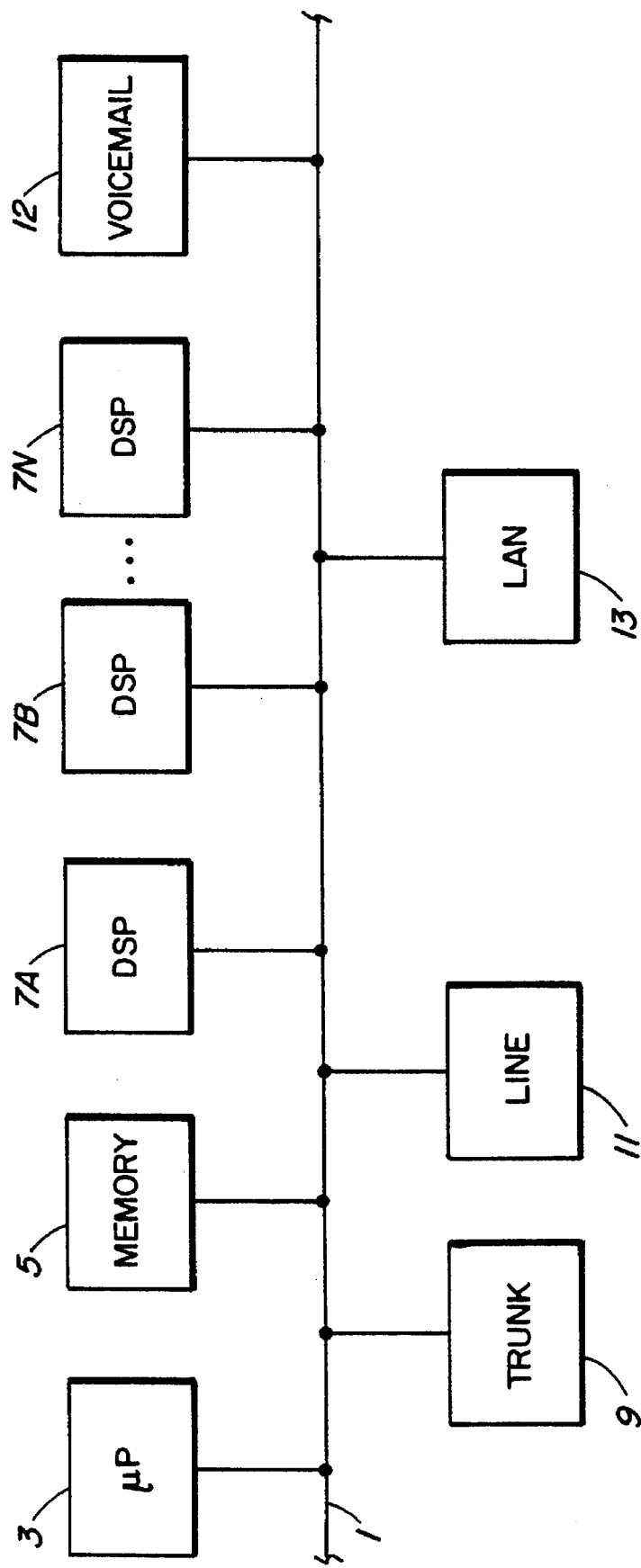

FIG. 1 is a block diagram of system in which the invention may be implemented. A main bus 1 of a telephone switching system has a microprocessor 3, a memory 5, several digital signal processors 7A–7N, trunks 9 and lines 11 connected for communication, and in some systems, also a local area network (LAN) 13. A voicemail system is also connected to the bus 1.

Another system which can be used to implement the invention is described in U.S. Pat. No. 4,615,028 issued Sep. 30, 1986 and U.S. Pat. No. 4,616,360 issued Oct. 7, 1986, invented by Conrad Lewis, and assigned to Mitel Corporation. In the latter system, the memory connected to the main bus should be modified to add software programs to implement the present invention as will be described herein, and digital signal processors to perform the function as will be described herein should also be added. Some of the functions may be performed by other subsystems of the main system, such as by storing subscriber line drivers in peripheral circuits. In addition, agent telephones are connected to line circuits and/or to the LAN of this system.

Figure 2:
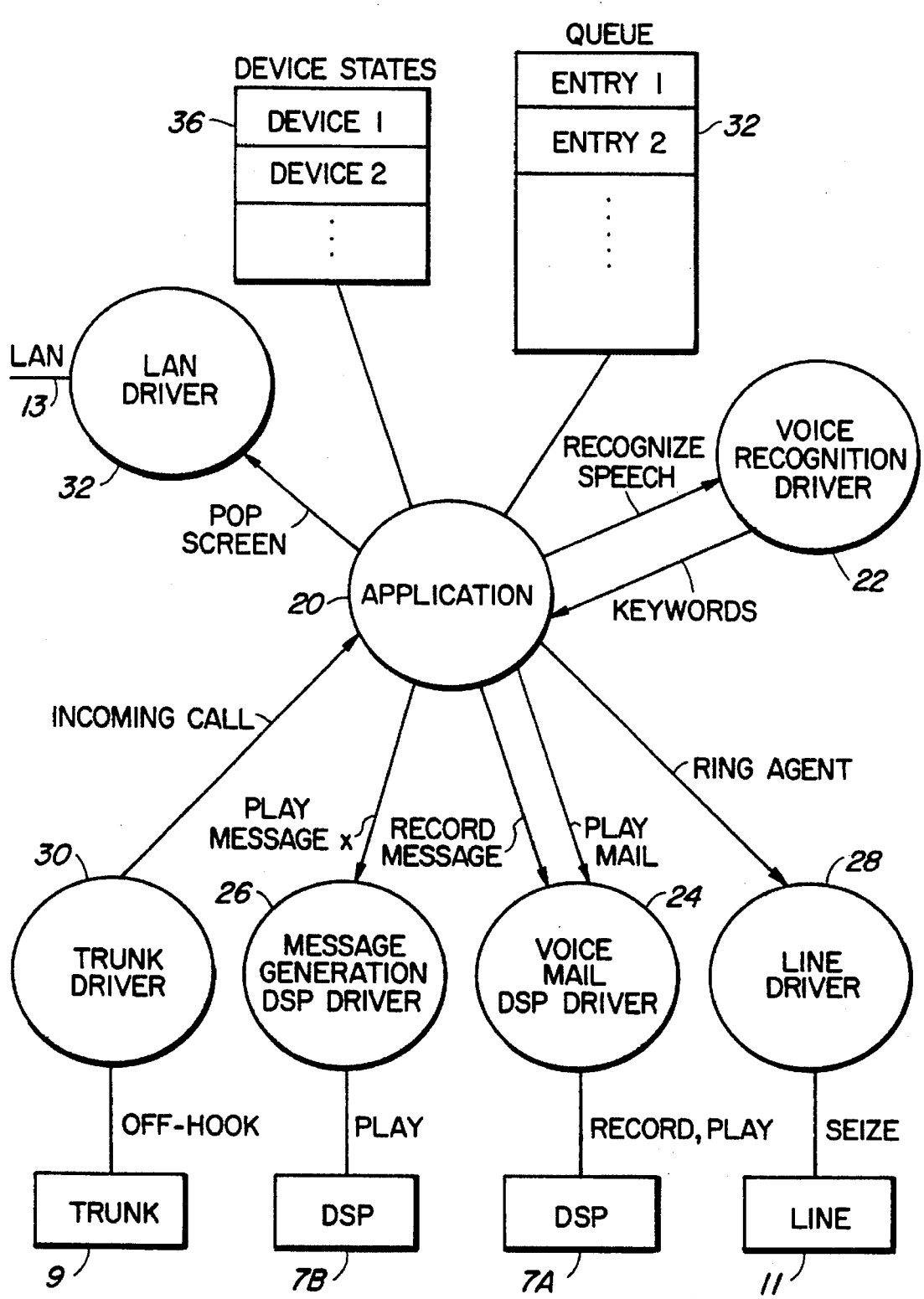

Memory 5 contains various peripheral drivers, as will be described now with reference to FIG. 2, which illustrates the software program functions. An application program (referred to simply as application, below), which can be operated by processor 3, operates the present invention. The application communicates with a voice recognition driver 22, voice mail digital signal processor (DSP) driver 24, message generation DSP driver 26, and line and trunk drivers 28 and 30 respectively. It also contains a LAN driver 32, if a LAN is used. The drivers 24, 26, 28, 30 and 32 operate DSPs 7A and 7B and lines, trunks and LANs 11, 9 and 32 respectively.

Operation of the invention will now be described as an entire sequence, from the initiation of a preliminary call, through to the completion of a follow-up call from a subscriber to an agent; embodiments of the invention of various scope are contained in this description and will become evident from within this description.

When a preliminary call is received from a subscriber, trunk 9 is seized by the trunk driver 30. The seizure is communicated to application 20. Application 20 enables message generation DSP driver 26 to cause DSP 7B to synthesize a message, which is sent by the system to the calling subscriber via the trunk 9. This message could be e.g. "Welcome to the company X help desk. If this is a follow-up call, please state, or dial, your ticket number. Otherwise please state, or dial, your client identification number".

The calling subscriber then either enunciates or keys in using the telephone keypad either the client identification number, or the ticket number. If the number is stated by voice, the application sends it to the voice recognition driver, which detects key words of the voiced message (which may be the entire message, or parts of the message, e.g. only the numbers in the message "my ticket number is five, four, three, nine, fifty-five"). The voice recognition driver may include digitizing software, or a physical circuit, or digitizing software or a physical circuit may be physically separated from the single element illustrated in FIG. 2.

A message containing the key words is then provided by the voice recognition driver to the application, which optionally checks a database (not shown) to determine that the key words are valid. The application can then command the driver 26 to synthesize additional questions, gathering information about the calling subscriber, and the process described above is repeated. The purpose of the information gathering is to determine which agent would be the most appropriate to which to route the call. Once sufficient information is gathered, by voicing questions in a menu tree form, an appropriate agent or group of agents is selected to which the call should be routed. This process, using recorded messages and determining responses in a menu tree has been implemented in the prior art, using dialing tone multifrequency (DTMF) detection. Voice recognition to implement responses to the menu tree has not.

Assuming that all of the appropriate agents are busy, the driver 26 is again enabled, to synthesize a message such as "I am sorry, all the agents are busy. Do you wish to leave a number where you can be reached, or a voice mail message and number?" If the caller responds "No", this is analyzed by driver 22, and the application causes an appropriate termination message to by synthesized via driver 26, such as "Thank you, call again". If the caller responds "Yes", an appropriate message is again caused to be synthesized, such as "Please state or dial the number where you can be reached, followed by a message".

The number that is voiced or dialed by the caller is analyzed as described above, and a ticket is generated, and is placed in queue 32, stored in memory 5. The callback message is stored provided to voice mail DSP driver 24 for processing by DSP 7A, and is stored in a voice mail memory at a memory entry identifier.

A representative ticket is shown in FIG. 3. The ticket contains data comprised of a ticket number generated by the application, a client identification previously voiced by the caller, the callback number of the caller as voice recognized by the driver 22, and a pointer to the voice mail box entry of the stored message provided by the caller, the voice mail box entry identifier stored as the pointer having been generated by the voicemail system 12. The ticket is stored as the next sequential available entry in queue 32, and the ticket number is voice synthesized in a message enabled by the application accessing driver 26 and DSP 7B, and is provided over trunk 9 to the calling subscriber.

Also stored in memory 5 is a table 36 of device states, that store the state of devices to be accessed under control of application 20, such as an agent line. A typical device state entry 38 is shown in FIG. 4.

Assuming an appropriate agent is free, the application, instead of generating a ticket, accesses line driver 28 and causes the calling line to be connected through the telephone system to the agent connected to line 11. In case the agent's telephone equipment is connected to an interface to LAN 32, the call is routed using LAN driver 32 to the agent via the LAN 13.

If the agent determines that the call is likely to result in a follow-up call, or if desired by designer, a ticket is generated concerning the call, with a ticket number. This ticket is preferably stored in another queue, similar to queue 32, related to the agent to which the call was directed.

It should be noted that the queue 32 or the other queue referred to can be a single queue with an entry in addition to those shown designating an agent or agent group, or can be separate queues each related to a separate agent or group of agents, which agents have been determined by the information originally given by the caller, or by the particular agent to which the call has been completed.

With the agent busy, and a ticket and a message generated and stored, or in the case of a completed call to the agent as noted immediately above, the voice synthesized ticket number given to the calling subscriber and the call terminated, assume now that the caller calls as a follow-up call. The application 20 follows the first sequence noted above, asking for a ticket number. The caller states the ticket number, which is recognized by driver 22 and the ticket number data is provided to the application. The application looks up the ticket number in queue 32, and thus knows that this is a valid follow-up call, but also immediately knows which agent or group of agents the ticket relates to by the agent number shown in the ticket, or by the designation of the queue in which the ticket has been found.

The application now can cause a synthesized voice message asking the caller whether it merely wishes to leave a message, or whether it wishes to speak to the agent. After voice recognizing the answer in a manner as described above, the application generates another ticket, with a pointer to the new voice message left by the caller in case it wishes only to leave a message, or checks the device states table 36 to determine whether the agent which is designated in the original ticket that it located is free. If that agent is free, the call is routed to that agent. If that agent is still busy, in a manner described above the application causes the generation of a synthesized message to the caller advising that the agent is still busy, and asking whether it wishes to leave another message. If another message is left, it is stored in the voicemail system, and a pointer is entered into the new ticket, the new ticket number being given to the caller. In the latter case, the call is terminated as before.

When the agent becomes free, the application detects this new state via line driver 28 or LAN driver 32, and stores that new state in device states table 36. If the device states table 36 is part of the main telephone system database, application 20 need merely check it to find the state of any agent.

When the agent becomes free, the application checks the queue or queues relating to that agent, and retrieves the ticket and all associated tickets, as can be correlated by client identification, and calls the agent. The agent is given the number of the caller, as well as the voice mail that was left, retrieved from recognition of the voice mail box pointer in the ticket or in plural tickets. Indeed, since the caller identification is contained in the ticket or tickets, the application can look up all pertinent information about the caller from a caller (or customer) file, such as the name of the caller, products purchased from the company by the caller, etc., and provide this information along with the ticket information (e.g. time and date of the ticket, etc.) to the agent, either by voice synthesizing or by display on the agent's terminal.

The agent can now merely reject the ticket (placing it in a hold condition pending gathering of some information by the agent to be provided later to the caller), or can cause the application to delete the ticket or tickets from the queue, or can store some information about the call or caller in the caller's file by typing the information at the agents terminal, or can hit a key, causing the application to access the callback number left by the caller, and to automatically dial the caller, connecting the agent and the caller in a voice connection.

In the above manner, the entire sequence of calling or callback to an agent is automated.

A person understanding this invention may now conceive of alternative structures and embodiments or variations of the above. All of those which fall within the scope of the claims appended hereto are considered to be part of the present invention.

We claim:

1. A method of informing an agent of a follow-up call to the agent from a telephone subscriber comprising:
    (a) receiving said follow-up call from the telephone subscriber, and detecting that the agent is busy,
    (b) storing a callback number of the telephone subscriber,
    (c) storing at least part of a message provided by the telephone subscriber in association with the callback number,
    (d) determining from information conveyed in the follow-up call the identity of a specific agent to which the course of the follow-up call is to be directed, and
    (e) routing the message and the callback number to the specific agent when the specific agent becomes free.

2. A method as defined in claim 1 including the step of determining the identity of the specific agent by automatically recognizing at least part of the content of the message.

3. A method as defined in claim 1 including the step of determining the identity of the specific agent by automatic detection of digits dialed by the telephone subscriber.

4. A method as defined in claim 1 including the steps, carried out previous to the receiving step, of receiving a preliminary call from the subscriber, speech-synthesizing instructions and questions to said subscriber, automatically recognizing at least part of responses made by the subscriber, determining which of a plurality of agents the preliminay call should be routed to by an analysis of at least part of automatically recognized responses, and routing the call to a free agent of said plurality of agents in response to said analysis.

5. A method as defined in claim 4 including the steps of determining that no free agent exists, storing a preliminary callback number in a queue associated with a voice mail message, and routing the preliminary callback number and associated voice mail message in their queue turn to a free agent when a free agent becomes available.

6. A method as defined in claim 4 in which the preliminary callback number is detected by an analysis of dialed digits using a dialing tone multifrequency (DTMF) detector.

7. A method as defined in claim 4 in which the preliminary callback number is detected by an analysis of dialed digits by automatic voice recognition.

8. A method as defined in claim 5, including the free agent automatically dialing the preliminary callback number from data stored in the queue.

9. A method as defined in claim 5, including the free agent storing information about the preliminary call in association with the voice mail message upon the voice mail message being routed to the free agent.

10. A method as defined in claim 9, including the free agent automatically dialing the preliminary callback number from data stored in the queue.

11. A method as defined in claim 5 including the step of determining the identity of the specific agent by automatically recognizing at least part of the content of the message.

12. A method as defined in claim 5 including the step of determining the identity of the specific agent by automatic detection of digits dialed by the telephone subscriber.

* * * * *